United States Patent
Min

(10) Patent No.: US 7,075,588 B2
(45) Date of Patent: Jul. 11, 2006

(54) EDGE CORRECTION METHOD AND APPARATUS

(75) Inventor: Kyung-sun Min, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 10/246,547

(22) Filed: Sep. 19, 2002

(65) Prior Publication Data

US 2003/0156223 A1    Aug. 21, 2003

(30) Foreign Application Priority Data

Feb. 21, 2002  (KR)  ................... 2002-9284

(51) Int. Cl.
*H04N 5/21*       (2006.01)
(52) U.S. Cl. .................. 348/625; 348/606; 348/252
(58) Field of Classification Search ............... 348/625, 348/606, 252; 382/199, 266–269; H04N 5/21
See application file for complete search history.

(56) References Cited

U.S. PATENT DOCUMENTS

| | | | | |
|---|---|---|---|---|
| 4,410,912 A | * | 10/1983 | Hess et al. | ................... 348/625 |
| 4,559,558 A | * | 12/1985 | Hosoya et al. | ............... 348/625 |
| 5,050,227 A | * | 9/1991 | Furusawa et al. | ........... 382/269 |
| 5,204,747 A | * | 4/1993 | Shinkai | ...................... 348/625 |
| 5,512,956 A | * | 4/1996 | Yan | ............................ 348/606 |
| 6,268,933 B1 | * | 7/2001 | Kim | ........................... 358/1.9 |
| 6,496,605 B1 | * | 12/2002 | Osa | ............................ 382/268 |

FOREIGN PATENT DOCUMENTS

| KR | 60211 | 10/1992 |
|---|---|---|
| KR | 2000-47313 | 7/2000 |

OTHER PUBLICATIONS

Notice to Submit Response—Korean Patent Office, dated Feb. 7, 2004.

* cited by examiner

*Primary Examiner*—Trang U. Tran
(74) *Attorney, Agent, or Firm*—Staas & Halsey LLP

(57) ABSTRACT

An edge correction apparatus and a method of performing an effective edge correction of an image signal in horizontal, vertical and diagonal directions include generating a two-dimensional (2D) second differential signal from the image signal, generating first differential signals in the horizontal, vertical and diagonal directions from the image signal, selecting one of the first differential signals, combining the selected one and the 2D second differential signal, and correcting the edge of the image signal using the combined signal. Therefore, it is possible to effectively correct edges of the image signal in the horizontal, vertical and diagonal directions.

4 Claims, 10 Drawing Sheets

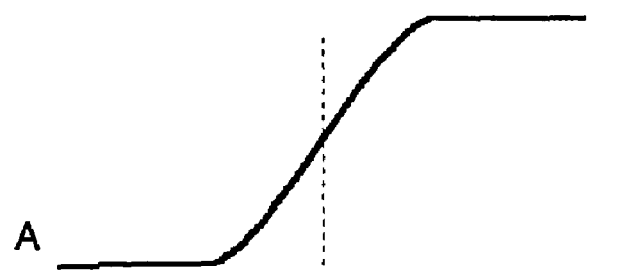
FIG. 2A (PRIOR ART)
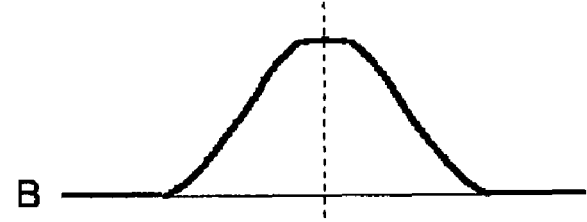
FIG. 2B (PRIOR ART)
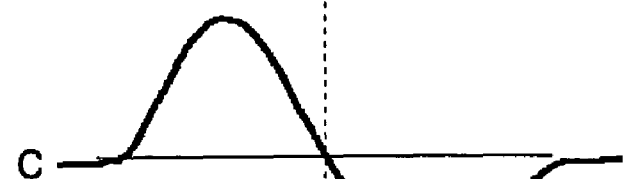
FIG. 2C (PRIOR ART)
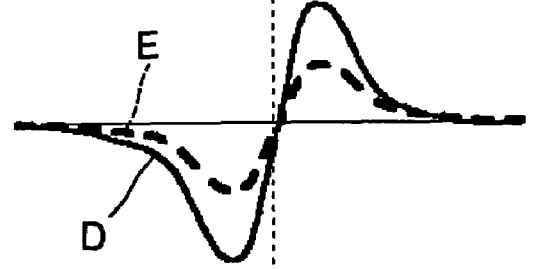
FIG. 2D (PRIOR ART)
FIG. 2E (PRIOR ART)
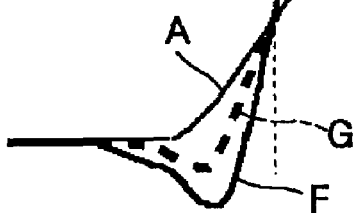

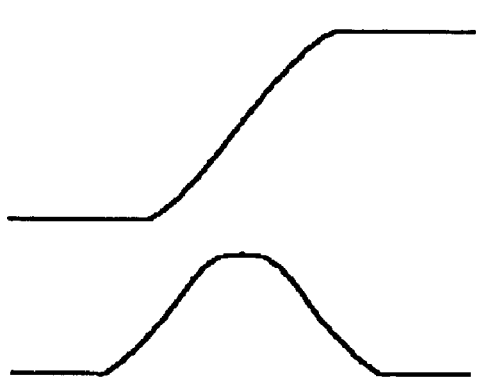
FIG. 6A
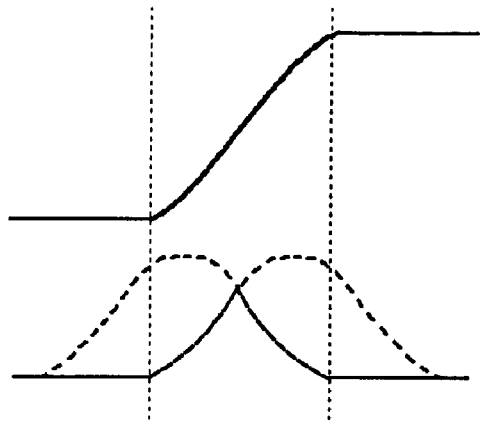
FIG. 6B
FIG. 7
| -1 | -1 | -1 |
|---|---|---|
| -1 | -8 | -1 |
| -1 | -1 | -1 |

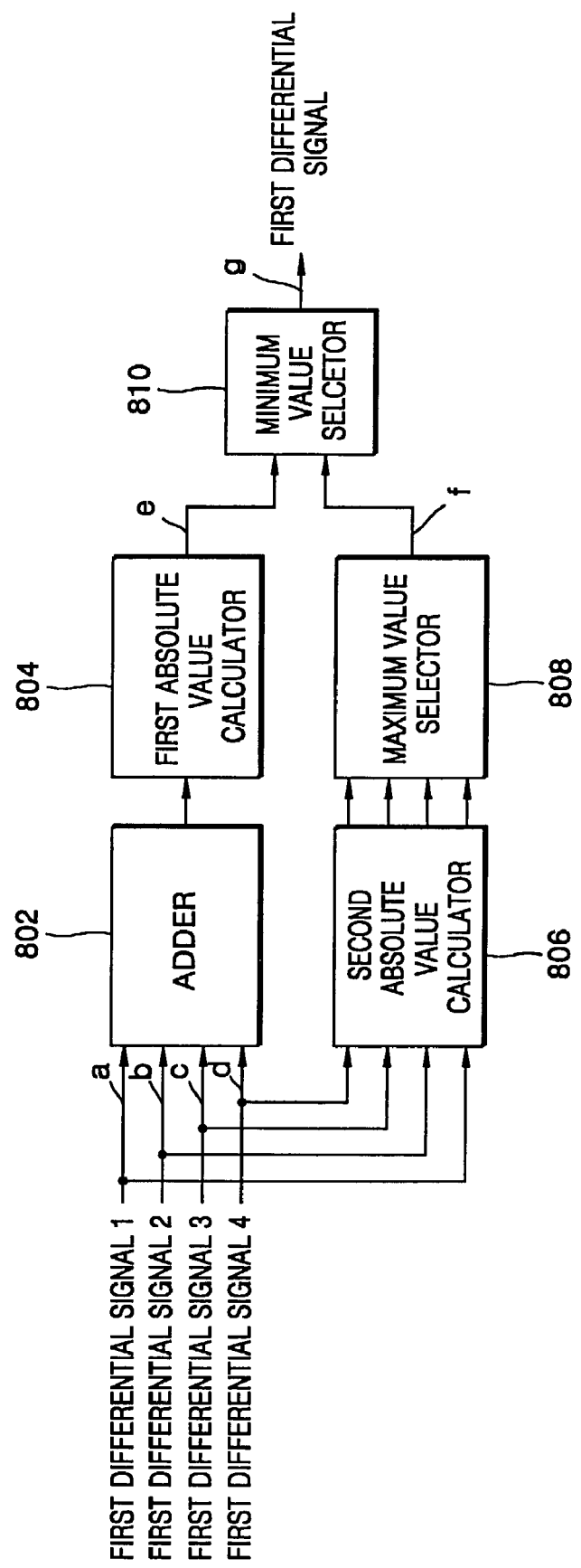

X -DIRECTION

| 1 | 0 | -1 |
|---|---|----|
| 2 | 0 | -2 |
| 1 | 0 | -1 |

X -DIRECTION

| 1 | 0 | -1 |
|---|---|----|
| 1 | 0 | -1 |
| 1 | 0 | -1 |

X -DIRECTION

| 0 | 0 | -1 |
|---|---|----|
| 0 | 1 | 0 |
| 0 | 0 | 0 |

Y -DIRECTION

| -1 | -2 | -1 |
|----|----|----|
| 0  | 0  | 0  |
| 1  | 2  | 1  |

Y -DIRECTION

| -1 | -1 | -1 |
|----|----|----|
| 0  | 0  | 0  |
| 1  | 1  | 1  |

Y -DIRECTION

| -1 | 0 | 0 |
|----|---|---|
| 0  | 1 | 0 |
| 0  | 0 | 0 |

EDGE CORRECTION METHOD AND APPARATUS

CROSS-REFERENCE TO RELATED APPLICATIONS

This application claims the benefit of Korean Patent Application No. 2002-9284, filed Feb. 21, 2002, in the Korean Intellectual Property Office, the disclosure of which is incorporated herein by reference.

BACKGROUND OF THE INVENTION

1. Field of the Invention

The present invention relates to an edge correction apparatus, and more particularly, to an improved apparatus for and a method of effectively correcting an edge of an image signal in horizontal, vertical and diagonal directions.

2. Description of the Related Art

An image signal, which is reproduced by a recording and reproducing apparatus, transmitted via a cable, or taken by a television camera, is prone to losing its high-frequency component when passing through a total transmission band such as a transmission and/or recording fields. Especially, in this case, edges of an image corresponding to the image signal become unclear, and a sharpness of the image is lowered. This triggers a need to improve a quality of an image.

Also, a method of enhancing the quality of the image is required to clearly reproduce the image signal of a limited definition, e.g., a television signal or a VTR signal, and display the image on a display apparatus, such as a plasma display panel (PDP) or a projection TV that is getting bigger and bigger in size.

In order to enhance the quality of the image signal, a general edge correction apparatus enhances the definition of the edges of the image signal by obtaining a differential signal from the image signal and adding the differential signal to the image signal. However, although the general edge correction apparatus performs the edge correction on the image signal in vertical and horizontal directions, an edge of the image signal in a diagonal direction is not corrected. Therefore, it is impossible to enhance the overall definition of the image.

FIG. 1 is a block diagram of a conventional edge correction apparatus. This edge correction apparatus includes a delayer 102, a first differentiator 104, an absolute value calculator 106, a second differentiator 108, first and second multipliers 110 and 112, and an adder 114.

The edge correction apparatus of FIG. 1 corrects edges of an image signal by obtaining a second differential signal and adding it to the image signal. At this time, the delayer 102 is used to compensate for time delays in obtaining the second differential signal.

The edge correction apparatus of FIG. 1 corrects the edges of the image signal in a horizontal direction by correcting a horizontal component of the image signal, and corrects edges of the image signal in the vertical direction by correcting a vertical component of the image signal.

When the image signal is input to the edge correction apparatus of FIG. 1, the input image signal is differentiated in the first differentiator 104 to generate a first differential signal. Then, the first differential signal is applied to the second differentiator 108 to generate a second differential signal.

Meanwhile, the first differential signal is transmitted to the absolute value calculator 106 to obtain its absolute value. An absolute value of the absolute value calculator 106 and the second differential signal output from the second differentiator 108 are combined in the first multiplier 110. An output of the first multiplier 110 is transmitted to the second multiplier 112. Then, the second multiplier 112 amplifies the output of the first multiplier 110 according to a predetermined gain. An output of the second multiplier 112 is transmitted to the adder 114.

The adder 114 is also given the input image signal delayed by the delayer 102. Thus, the delayed input image signal and a combination of the first and second differential signals that are differentiated from the input image signal are inputted to the adder 114.

FIGS. 2A–2E are waveform diagrams illustrating an operation of the edge correction apparatus of FIG. 1. Referring to FIGS. 2A–2E, a signal A is the input image signal having a rising component. Here, the rising component of the input image signal is formed at an edge of the image signal, e.g., on a border between dark and bright sides in an image.

In FIG. 2B, a signal B is an absolute value of the first differential signal obtained by first differentiating the signal A. In FIG. 2C, a signal C is a second differential signal that is differentiated from the signal B, that is, a signal that is differentiated two times from the signal A. In FIG. 2D, a signal D is obtained by multiplying the first differential signal, i.e., the signal B, by the second differential signal, i.e., the signal C, in the first multiplier 110. In FIG. 2D, a signal E is obtained by adjusting a gain of the signal D by the second multiplier 112. In FIG. 2E, a signal F is obtained by adding the signals A and D by the adder 114, and a signal G is obtained by adding signals A and E by the adder 114. A comparison of signals F and G shows that the edges of the image signal are corrected by adjusting the gain applied to the second multiplier 112.

However, the edge correction apparatus of FIG. 1 is disadvantageous in that it can be applied to correct the edge of an image signal only in the vertical and horizontal directions, but the edge of the image signal in a diagonal direction is not corrected. Therefore, it is difficult to enhance the overall definition of the image signal with this edge correction apparatus.

SUMMARY OF THE INVENTION

To solve the above- and other problems, it is an object of the present invention to provide a method of effectively correcting an edge of an image in a diagonal direction as well as in vertical and horizontal directions.

It is another object of the present invention to provide an edge correction apparatus using a method of effectively correcting an edge of an image.

Additional objects and advantages of the invention will be set for the in part in the description which follows and, in part, will be obvious from the description, or may be learned be practice of the invention.

Accordingly, to achieve the above and other objects, there is provided a method of correcting an edge of an image signal. The method including] includes generating a two-dimensional (2D) second differential signal from the image signal, generating first differential signals in horizontal, vertical and diagonal directions from the image signal, selecting one from the first differential signals, combining the selected one of the first differential signals and the 2D second differential signal, and correcting the edge of the image signal using the combined signal.

To achieve the above and other objects, there is provided an apparatus for correcting the edge of the image signal. The apparatus includes a 2D second differentiator generating a 2D second differential signal from the image signal, first differentiators generating first differential signals from the image signal in horizontal, vertical, right diagonal and left diagonal directions, a selector selecting one of the first differential signals, a first multiplier multiplying an output of the selector by an output (2D second differential signal) of the 2D second differentiator, a delayer delaying the image signal, and an adder adding an output (delayed image signal) of the delayer and an output of the first multiplier.

According to an aspect of the present invention, the selector selects one of absolute values of the first differential signals, generates a sum of the first differential signals, and selects one of the selected absolute value and the sum as the first differential signal.

According to an aspect of the present invention, the apparatus includes a second multiplier multiplying the output of the first multiplier by a gain. An output of the second multiplier is multiplied by the delayed image signal in the adder.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 2A through 2E are waveform diagrams illustrating an operation of the edge correction apparatus of FIG. 1;

FIGS. 6A through 6B are waveform diagrams illustrating an operation of the first differentiators of the edge correction apparatus of FIG. 4; and FIG. 7 is an example of a two-dimensional second differentiator of the edge correction apparatus illustrated in FIG. 4;

FIG. 8 is a block diagram of a selector of the edge correction apparatus illustrated in FIG. 4;

FIGS. 10A through 10C show a Sobel operator, a Prewitt operator, and a Robert operator, respectively; and FIGS. 11A and 11B show a Kirsh filter and a Template Match, respectively.

DETAILED DESCRIPTION OF THE PREFERRED EMBODIMENTS

Figure 1:
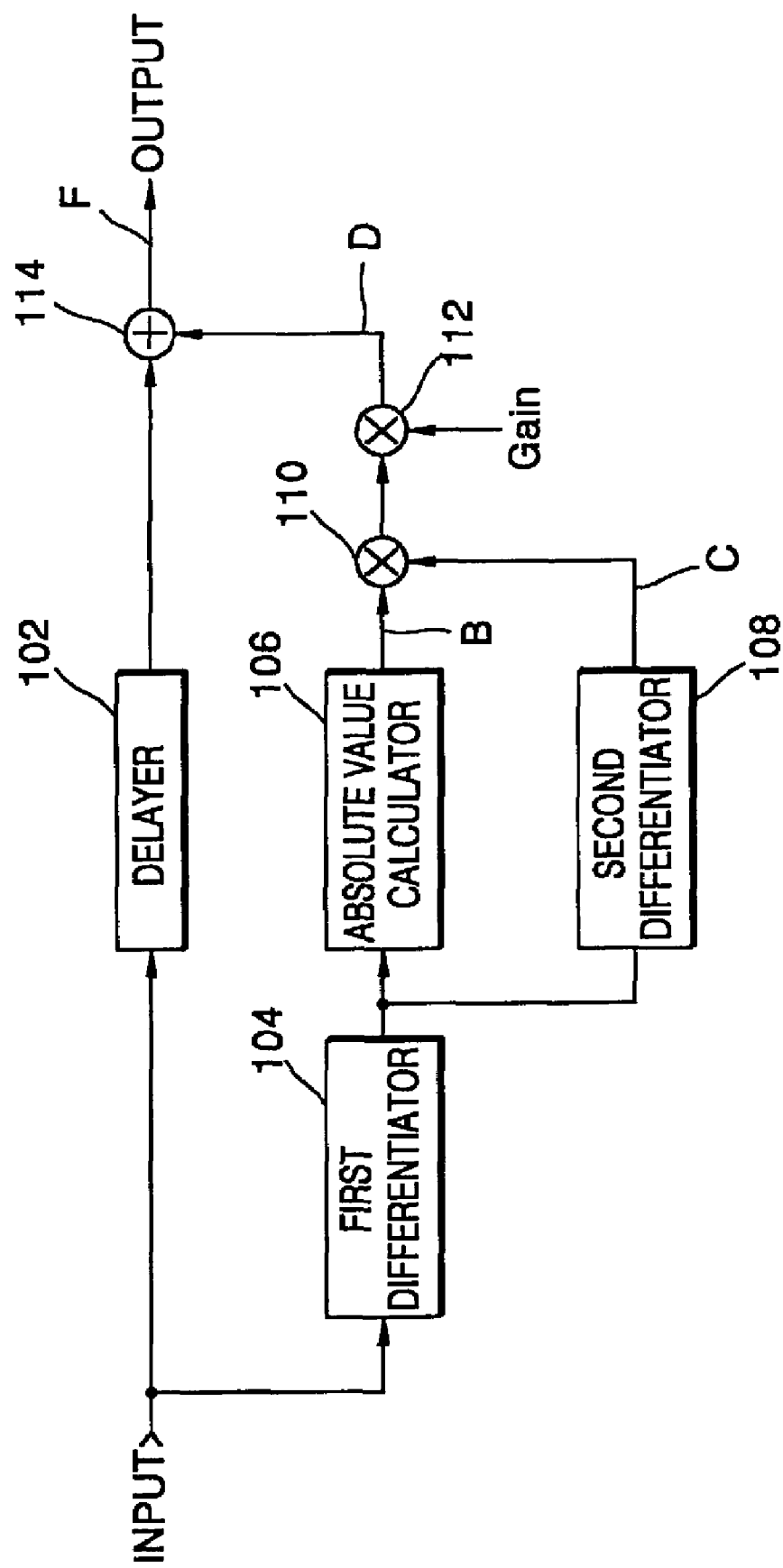
FIG. 1 is a block diagram of a conventional edge correction apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
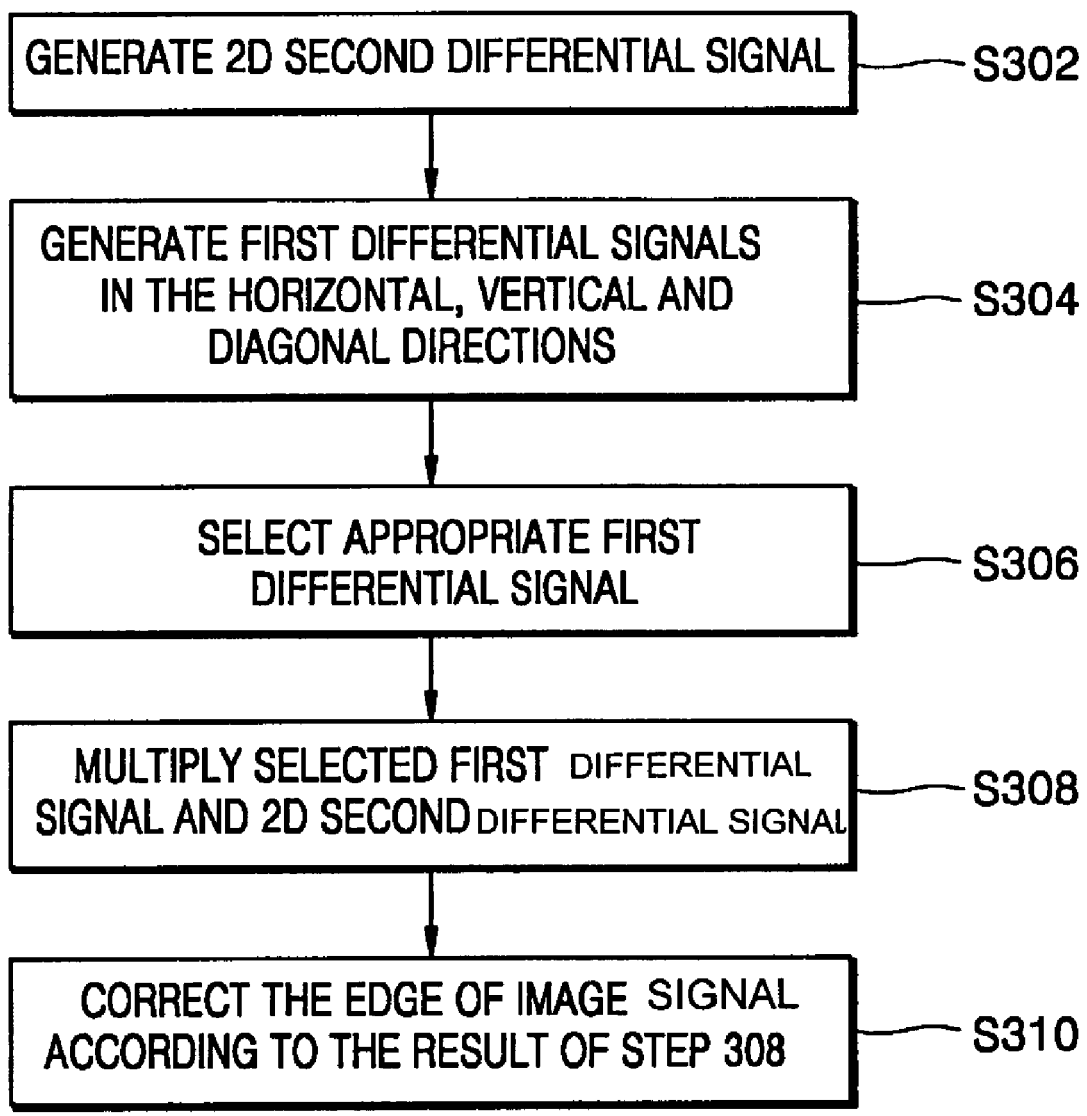
FIG. 3 is a flow chart explaining a method of correcting an edge of an image signal according to an embodiment of the present invention.

FIG. 3 is a flow chart explaining a method of correcting edges of an image signal according to an embodiment of the present invention. In this method, a signal required for an edge correction of the image signal is obtained by forming a two-dimensional (2D) second differential signal, which indicates an intensity of an edge of an image corresponding to the image signal, and the 2D second differential signal is multiplied by a first differential signal, which indicates a direction of the edge. Here, the first differential signal is one selected from a plurality of first differential signals of the image signal, i.e., first differential signals 1 through 4 in horizontal, vertical and diagonal directions.

Referring to FIG. 3, the two-dimensional (2D) second differential signal is generated from the image signal in operation 302. The 2D second differential signal indicates only the intensity of the edge but does not indicate the direction of the edge.

Next, the first differential signals are generated from the image signal in the horizontal, vertical and diagonal directions in operation 304. The first differential signals indicate respective ones in the horizontal, vertical and diagonal directions of the edge of the image signal.

In operation 304, a certain pixel is selected, and differences between the certain pixel and adjacent pixels in each direction are calculated. Then, a smallest one of the calculated differences is determined as a differential value to correct the edge of the image signal. A transition time to obtain a corrected signal of the image signal may be improved (shortened) using this differential value.

Next, the first differential signals in the horizontal, vertical and diagonal directions are compared with one another to generate a first selection signal, and an appropriate one is selected as the first differential signal in operation 306. Here, the selected first differential signal is a smaller one of the first selection signal having a largest absolute value among the first differential signals in the horizontal, vertical and diagonal directions, and an added signal having an absolute value obtained from a combination of these first differential signals.

After operation 306, the first differential signal selected in operation 306 is multiplied by the 2D second differential signal in operation 308. As a result, a signal having a largest directional component is obtained to correct the edge. At this time, a gain of the obtained signal is adjusted to control an extent of correcting the edge.

Then, the edge of the image signal is corrected with the first differential signal obtained in operations 306 and 308. In detail, the image signal is delayed by the time required to perform operations 302 through 308, and then combined with the signal obtained in operation 308.

Hereinafter, an edge correction apparatus performing the method of FIG. 3 will be described in detail with reference to FIG. 4.

Figure 4:
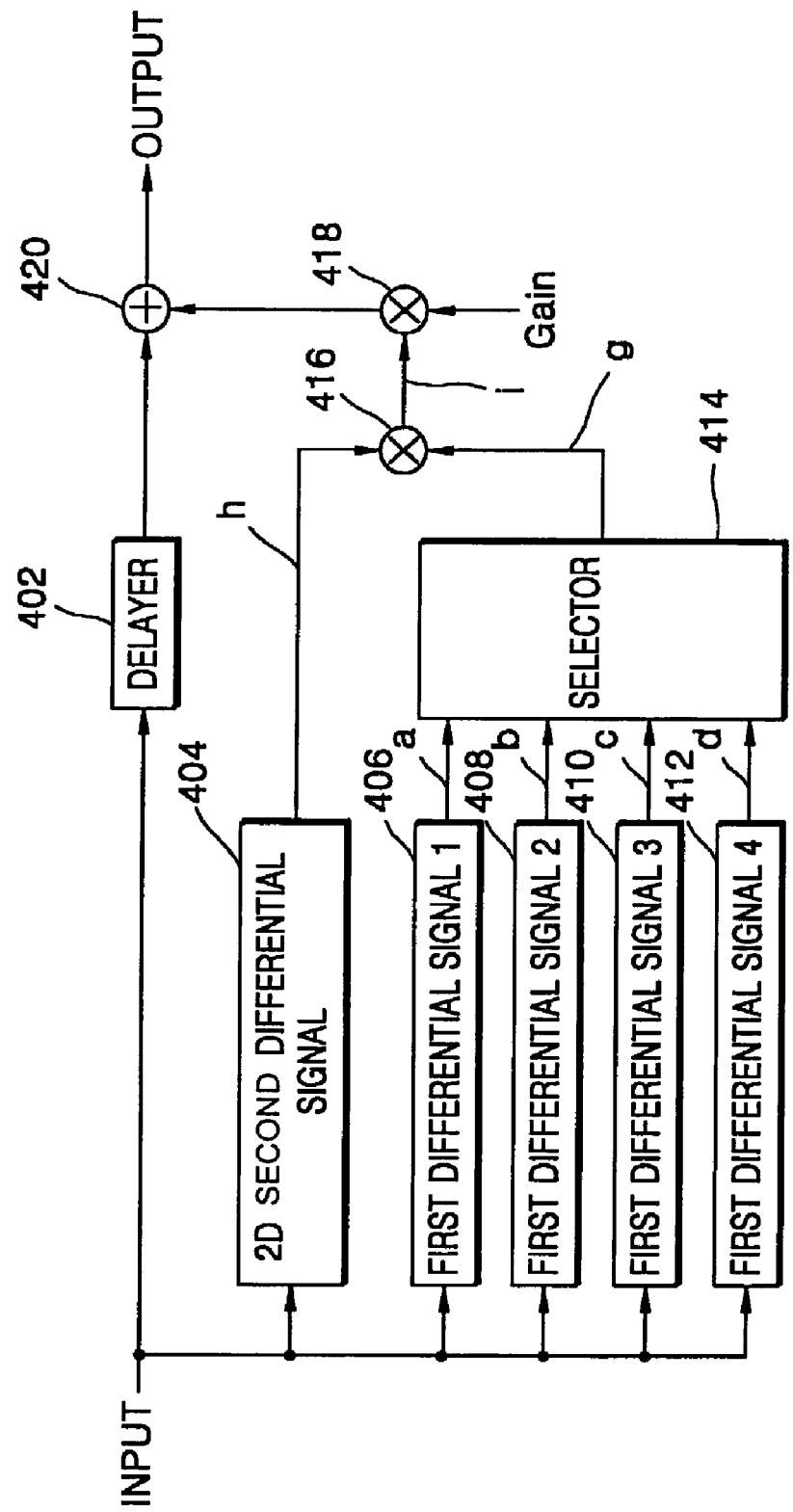
FIG. 4 is a block diagram of an edge correction apparatus performing the method of FIG. 3.

FIG. 4 is a block diagram of the edge correction apparatus. In this edge correction apparatus, the 2D second differential signal is generated from the input image signal, and then multiplied with one selected from the first differential signals in the horizontal, vertical, right diagonal and left diagonal directions. Next, a resultant of the multiplication of the 2D second differential signal and the selected first differential signal is added to the image signal that is delayed by a delayer, thereby correcting the edge of the image signal.

The edge correction apparatus of FIG. 4 includes a delayer 402, a 2D second differentiator 404, first through fourth differentiators 406, 408, 410 and 412 that generate the first differential signals from the image signal in the horizontal, vertical, right diagonal and left diagonal directions, a selector 414, first and second multipliers 416 and 418, and an adder 420. This edge correction apparatus corrects the image signal with regard to horizontal, vertical and diagonal components of the image signal, thereby effectively performing the edge correction.

When the image signal is input to the edge correction apparatus, the image signal is differentiated in the 2D second differentiator 404 to generate the 2D second differential signal.

The first through fourth differentiators 406, 408, 410 and 412 generate the first differential signals from the image signal in the horizontal, vertical, right diagonal and left diagonal directions. An appropriate differential signal is selected as the selected first differential signal from these first differential signals in the selector 414. An output of the selector 414 is combined with an output of the 2D second differentiator 404 by the first multiplier 416.

An output of the first multiplier 416 is applied to the second multiplier 418. Then, the second multiplier 418 amplifies the output of the first multiplier 416 according to a predetermined gain.

An output of the second multiplier 418 is applied to the adder 420. Also, the adder 420 generates a sum of the image signal that is delayed by the delayer 402, and the gain-controlled output of the second multiplier 418. In conclusion, the adder 420 is given the input image signal and the differential value of the image signal differentiated by the 2D second differentiator 404, i.e., the corrected signal of the image signal whose edge is corrected in the horizontal, vertical and diagonal directions.

FIGS. 5A through 5D are examples of matrixes of the first differentiators 406, 408, 410 and 412 shown in FIG. 4. In detail, FIG. 5A through 5D correspond to the first differentiator 406 in the horizontal direction, the first differentiator 408 in the vertical direction, the first differentiator 410 in the right diagonal direction, and the first differentiator 412 in the left diagonal direction, respectively.

In a digital image, data is arranged to be scattered (allocated) at regular intervals, and thus, it is impossible to exactly calculate a required value through differential operations. Therefore, in this embodiment, the required value is obtained by making an approximate calculation by calculating a difference between the adjacent pixels.

Assuming that a differential value in the horizontal direction of x is $G(x)$, and a differential value in the vertical direction of y is $G(y)$, the equations $G(x)=f(x+1)-f(x)$, and $G(y)=f(y+1)-f(y)$ are obtained. Here, $f(x)$ denotes a value of the pixel in the direction of x, and $f(y)$ denotes the value of the pixel in the direction of y.

A matrix that is obtained from the above relationship and equations to be adapted to this image processing is called a mask or an operator.

From the matrixes illustrated in FIGS. 5A through 5D, it is noted that the edge of the image signal can be extracted in different directions even if the same operator is used.

Figure 5A:
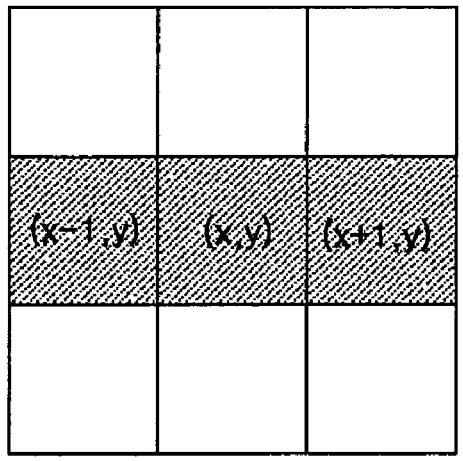
FIGS. 5A through 5D are examples of matrixes of first differentiators of the edge correction apparatus shown in FIG. 4.
Figure 5B:
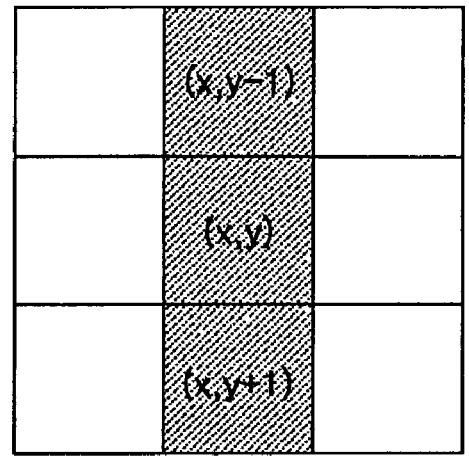
Figure 5C:
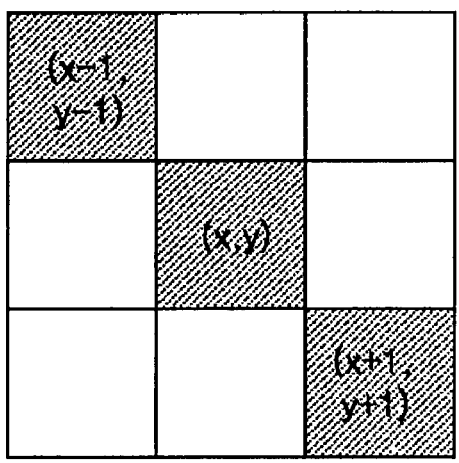
Figure 5D:
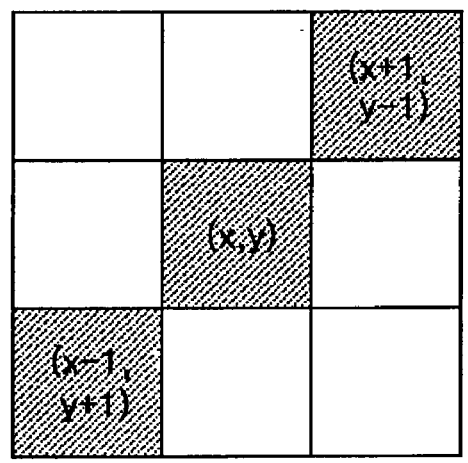

FIGS. 6A and 6B are waveform diagrams of operations of one of the first differentiators shown in FIG. 4. FIG. 6A is a waveform diagram of the first differential signal when a coefficient (−1, 0, 1) is applied to the mask of FIG. 5A, and FIG. 6B is a waveform diagram of the first differential signal having a smaller one of two first differential values obtained from precedent and subsequent pixels of a current pixel. That is, in the case of FIG. 6B, the two first differential values are calculated from the equation $\{(x,y)-(x-1,y)\}$ and $\{(x+1,y)-(x,y)\}$, and then, the smaller one of these two first differential values is selected as the first differential value.

The first differential signal shown in FIG. 6B is more effective in reducing the transition time to obtain the corrected signal of the image signal than that in FIG. 6A.

Although the operators are adopted in this embodiment as shown in FIGS. 5A through 5D, the present invention is not limited to the use of these operators. Therefore, those skilled in this art can correct the edge of an image signal according to the present invention, using a Sobel operator, a Prewitt operator, or a Robert operator instead of the operators of FIGS. 5A through 5D.

FIGS. 10A through 10C show the Sobel operator, the Prewitt operator, and the Robert operator, respectively.

The Sobel operator is resistant to noise, but it results in a too thick edge of the image signal. The Prewitt operator is vulnerable to noise and is adapted to correct the edge of the image signal in the horizontal and vertical directions. The Robert operator is used within a limited range and is also vulnerable to noise.

FIG. 7 is a view of an example of the 2D second differentiator, which is a 3×3 Laplacian mask that is mainly used in calculating a 2D second differential value (signal). Here, the 2D second differential value is a value that is differentiated from a first differential value, and is used in detecting the intensity of the edge of the image signal, but not in detecting the direction of the edge thereof. Assuming that a differential value obtained by the Laplacian mask is $L(x,y)$, an equation, $L(x,y)=4*f(x,y)-\{f(x,y-1)+f(x,y+1)+(x-1,y)+f(x+1,y)\}$, is obtained.

Figures 11A, 11B:
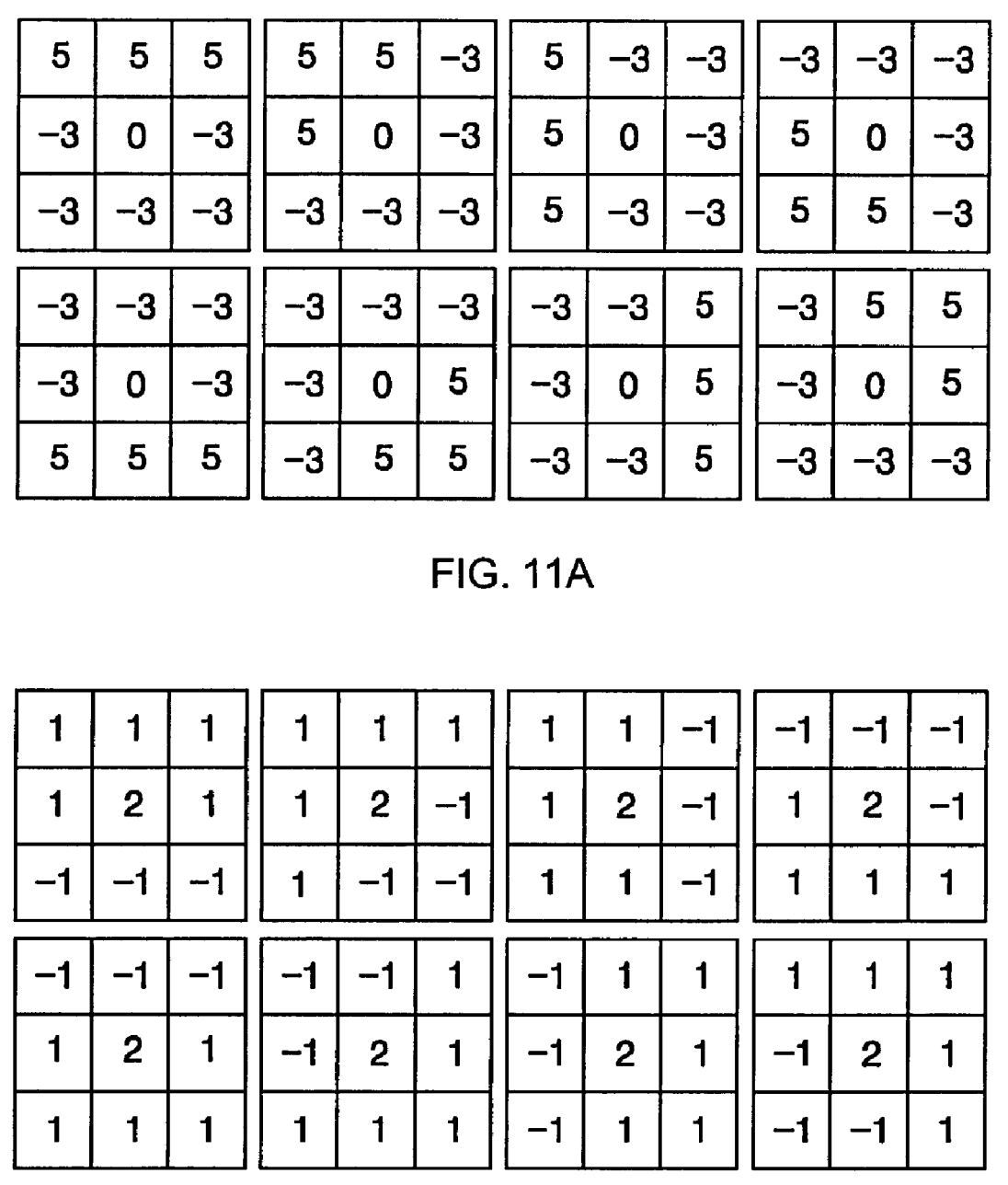

Here, the Laplacian mask is used as a second differential operator to calculate the 2D second differential value. However, those skilled in the art would calculate the 2D second differential value with a Kirsh filter or a Template match, instead of the Laplacian mask. FIGS. 11A and 11B show the Kirsh filter and the Template match, respectively.

FIG. 8 is a block diagram showing a structure of the selector 414 of the edge correction apparatus of FIG. 4. This selector 414 selects a first selection signal "f" having a largest absolute value from the first differential signals "a" through "d" in the horizontal, vertical and diagonal directions, selects a smaller one between an absolute value of the first selection signal "f" and an absolute value of an added signal "e" obtained from a combination of these first differential signals "a" through "d", and outputs a second selection signal "g" as the first differential signal.

The selector of FIG. 8 includes an adder 802, first and second absolute value calculators 804 and 806, a maximum value selector 808, and a minimum value selector 810.

Figures 9A, 9B, 9C:
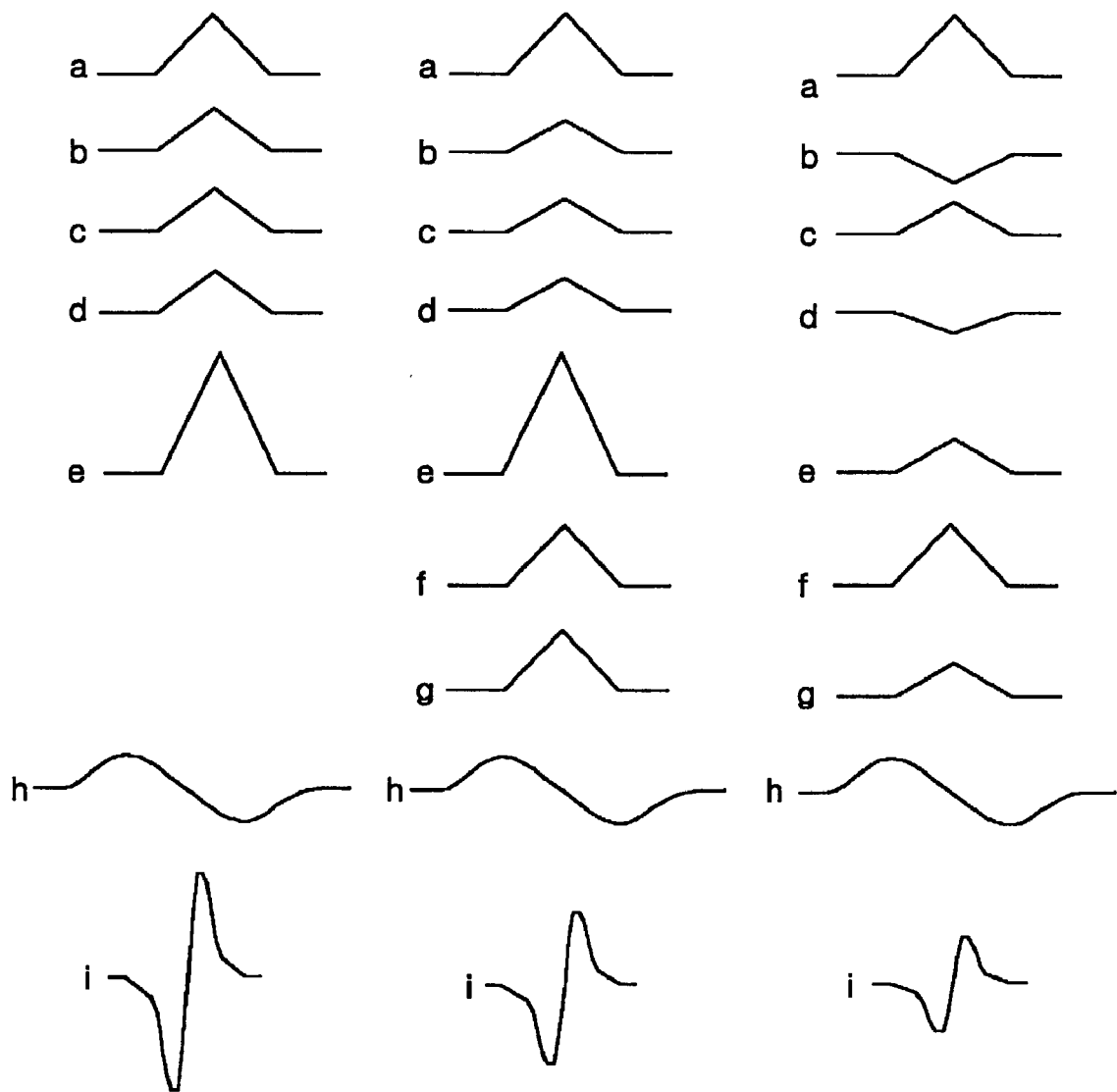
FIGS. 9A through 9C are waveform diagrams illustrating operations of the first differentiators, the selector, and the multiplier of the edge correction apparatus and method illustrated in FIGS. 3 through 5D.

When the first differential signals "a" through "d" in the horizontal, vertical and diagonal directions are input to the adder 802, the adder 802 adds these signals and outputs a resultant of the adding of the first differential signals "a" through "d" as the added signal "e" as shown in FIGS. 8–9C. An output of the adder 802 is applied to the first absolute value calculator 804. Then, the first absolute value calculator 804 outputs an absolute value (added signal "e") of the combination of first differential signals "a" through "d."

The second absolute value calculator 806 receives the first differential signals "a" through "d" of the image signal in the horizontal, vertical and diagonal directions, and outputs their absolute values. The outputs of the second absolute value calculator 806 are applied to the maximum value selector 808. Then, the maximum value selector 808 selects one value having the largest absolute value from these absolute values and outputs a resultant as a first selection signal "f." As a result, the first selection signal "f" having the largest absolute value is selected from the first differential signals "a" through "d," and output to the minimum value selector 810.

Thereafter, the outputs "e" and "f" (the added signal and the first selection signal, respectively) generated from the first absolute value calculator 804 and the maximum value selector 808, respectively, are transmitted to the minimum value selector 810. Then, the minimum value selector 810 selects the smaller one between the first selection signal "f," which has the largest absolute value among the first differential signals "a" through "d" of the image signal in the horizontal, vertical and diagonal directions, and the added signal "e" having the absolute value of the combination of the first differential signals "a" through "d" of the image signal in the horizontal, vertical and diagonal directions, and outputs the second selection signal "g" as the first differential signal.

FIGS. 9A through 9C are waveform diagrams of operations of the first differentiators 406, 408, 410, 412, the 2D second differentiator 404, and the selector 414, and the first multiplier 416 shown in FIG. 4. FIG. 9A is a waveform diagram of the operations of the first differentiators 406, 408, 410, 412 and the adder 802 without performing the outputting of the first and second selection signals by the selector 414 shown in FIG. 8, and FIGS. 9B and 9C are waveform diagrams of the operations of the first differentiators 406, 408, 410, 412 and the selector 414 with an operation of performing the outputting of the first and second selection signals by the selector 414 shown in FIG. 8.

Here, "a" through "d" denote first differential signals of the image signal generated from the first differentiators 406, 408, 410, 412 in the horizontal, vertical, right diagonal and left diagonal directions, respectively. Also, "e" indicates the added signal having the absolute value of the combination of first differential signals "a" through "d" as shown in FIGS. 8–9C.

If the operation of outputting the first and second selection signals is not performed by the selector 414 of FIGS. 4 and 8, the selector 414 outputs the added signal "e" that is obtained by combining the first differential signals "a" through "d" in the horizontal, vertical, right diagonal and left diagonal directions.

As a result, the edge correction apparatus of FIG. 4, according to the present invention, obtains the image signal by combining the image signal with the corrected signal "i" as shown in FIG. 9A, which is obtained by multiplying the added signal "e" and the second differential signal "h."

In FIG. 9A, the first differential signals "a" through "d" in the horizontal, vertical, right diagonal and left diagonal directions are of rising patterns and have positive values. The added signal "e," which has the absolute value of the combination of first differential signals "a" through "d," is generated from the first differential signals "a" through "d" of FIG. 9A, and the corrected signal "I," which is to be added into the original image signal, becomes too big in an edge portion. Therefore, an overflow may occur at the edge of the image signal due to a peaking portion of the signal "i."

Referring to FIG. 9B, the first differential signals "a" through "d" in the horizontal, vertical, right diagonal and left diagonal directions are output as positive roof signals, too. However, in this case, the minimum value selector 810 compares the first selection signal "f" in FIG. 9 with the added signal "e" to generate the second selection signal "g" as the first differential signal, selects the first selection signal "f" as the second selection signal, and outputs the first selection signal as the second selection signal "g." The output signal (second selection signal) "g" is multiplied with the 2D second differential signal "h" to generate the corrected signal. As a result, less peaking occurs in FIG. 9B than in FIG. 9A. Therefore, in a case of FIG. 9B, the edge of the image signal can be effectively corrected while suppressing an occurrence of peaking in the image signal.

Referring to FIG. 9C, the first differential signals "a" through "d" in the horizontal, vertical, right diagonal and left diagonal directions are also output as the positive roof signals. Thus, upon comparing the added signal "e" and the first selection signal "f," which is selected from the first differential signals "a" through "d", the added signal "e" is selected as the second selection signal (the first differential signal) and then multiplied with the 2D second differential signal "h" as shown in FIG. 9C.

In this embodiment, the edge correction apparatus of FIG. 4 and the 2D second differentiator of FIG. 7 are set to process an analog image signal. However, those skilled in the art would process a digital image signal by software.

For instance, a program code to obtain the Sobel operator shown in FIG. 10A is as follows:

```
function sobel (x,y: Integer): integer;
var
edge: Double:
begin
edge:
=abs(-data{x-1,y-1}-2*data{x-1,y}-data{x-1,y+1}+data{x+1,y-1}+2*data{x+1,y}+data{x+1,y+1});
//calculate variations in x (operator in the direction of x)
Result:
=round(edge+abs(-data{x-1,y-1}-2*data{x,y-1}-data{x+1,y-1}+Data{x-1,y+1}+2*data{x,y+1}+data{x+1,y+1}));
//calculate variations in y
(operate in the direction of y: return to the Result)
end;
```

A program code for obtaining the Laplacian operator shown in FIG. 7 is as follows:

```
function Laplacian (x,y: Integer): integer;
Begin
Result:
=round(abs(-data{x-1,y-1}-data{x,y-1}-data{x+1,y-1}-data{x-1,y+1}
-data {x,y+1}-data{x+1,y+1}-data{x-1,y}-8*data{x,y}-data{x+1,y}));
//(return to Result)
end;
```

As described above, in an apparatus for and method of correcting the edge of the image signal, according to the present invention, the edge of the image signal can be corrected by obtaining the 2D second differential signal from the image signal and combining the second differential signal with the first differential signal, which is selected from the first differential signals in the horizontal, vertical and diagonal directions. Therefore, it is possible to effectively correct the edge of the image signal in the horizontal, vertical and diagonal directions.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of correcting an edge of an image signal, the method comprising:
   generating a two-dimensional (2D) second differential signal from the image signal;
   generating first differential signals in first, second, and third directions from the image signal, the third direction disposed between the first and second directions;
   selecting one of the first differential signals;
   combining the selected first differential signal and the 2D second differential signal to generate a combined signal; and
   correcting the edge of the image signal using the combined signal, wherein the selecting of the selected first differential signal comprises:
   adding the first differential signals to generate an added signal;
   comparing the first differential signals with each other to select one having a largest absolute value in the first differential signals as the selected first differential signal; and
   selecting a smaller one between the added signal and the selected first differential signal.

2. An apparatus for correcting an edge of an image signal, the apparatus comprising:
   a 2D second differentiator generating a 2D second differential signal from the image signal;
   first differentiators generating first differential signals from the image signal in first, second, third, and fourth directions, the third and fourth directions disposed between the first and second directions;
   a selector selecting one of the first differential signals;
   a multiplier multiplying the selected first differential signal of the selector by the 2D second differential signal of the 20 second differentiator to generate a corrected signal;
   a delayer delaying the image signal; and
   an adder adding the delayed image signal of the delayer and the corrected signal of the multiplier.
   wherein the selector comprises:
   a maximum value selector selecting one having a largest differential value from the first differential signals to generates a first selection signal;
   an adder adding the first differential signals to generate an added signal; and
   a minimum value selector selecting a smaller one between the added signal of the adder and the first selection signal to generate a second selection signal as the corrected signal.

3. The method of claim 2, wherein the selector comprises:
   a first absolute value calculator installed between the adder and the minimum value selector to calculate an absolute value of an output from the adder to generate the added signal; and
   a second absolute value calculator installed in the maximum value selector absolute values of the first differential signals] to generate the first selection signal.

4. An apparatus for correcting an edge of an image signal, the apparatus comprising:
   a first differentiator unit generating from the image signal first differential signals in first, second, and third directions with respect to the edge of the image signal, the third direction disposed between the first and second directions;
   a second differentiator unit generating from the image signal a second differential signal having an intensity of the edge of the image signal;
   a selector generating a selection signal in response to the first differential signals;
   a multiplier multiplying the selection signal of the selector by the second differential signal of the second differentiator to generate a corrected signal: and
   an adder adding the image signal and the corrected signal of the multiplier;
   wherein the selector comprises:
   an adder generating an added signal from a combination of the first differential signals;
   a first selector selecting one having a greatest value in the first differential signals; and
   a second selector selecting a smaller one between the added signal and the selected one as the selection signal.

* * * * *

UNITED STATES PATENT AND TRADEMARK OFFICE
CERTIFICATE OF CORRECTION

PATENT NO.        : 7,075,588 B2                                              Page 1 of 1
APPLICATION NO. : 10/246547
DATED             : July 11, 2006
INVENTOR(S)       : Kyung-sun Min It is certified that error appears in the above-identified patent and that said Letters Patent is hereby corrected as shown below:

Column 9, Line 35, change "20" to --2D--.

Column 9, Line 39, change "multiplier." to --multiplier--.

Column 9, Line 43, change "generates" to --generate--.

Column 10, Line 14, change "signal]" to --signals--.

Column 10, Line 30, after "signal" change ":" to --;--.

Signed and Sealed this

Twenty-third Day of January, 2007

JON W. DUDAS
*Director of the United States Patent and Trademark Office*